United States Patent [19]

Maruyama

[11] Patent Number: 5,851,737
[45] Date of Patent: Dec. 22, 1998

[54] SPATIALLY VARIED INTERFACES FOR COMPOSITE MATERIALS

[75] Inventor: Benji Maruyama, Yellow Springs, Ohio

[73] Assignee: The United States of America as represented by the Secretary of the Air Force, Washington, D.C.

[21] Appl. No.: 863,236

[22] Filed: May 27, 1997

[51] Int. Cl.⁶ .................................................. G03F 7/00
[52] U.S. Cl. ...................... 430/325; 430/945; 430/320; 428/375
[58] Field of Search .................. 430/325, 320, 430/322, 324, 945; 427/510; 428/375, 377, 378

[56] References Cited

U.S. PATENT DOCUMENTS

| | | | |
|---|---|---|---|
| 4,916,115 | 4/1990 | Mantese et al. | 430/311 |
| 5,021,398 | 6/1991 | Sharma et al. | 427/63 |
| 5,173,354 | 12/1992 | Raj | 428/209 |
| 5,198,412 | 3/1993 | Nagesh et al. | 430/311 |
| 5,413,851 | 5/1995 | Storer | 428/361 |
| 5,514,474 | 5/1996 | Morgan et al. | 428/375 |

OTHER PUBLICATIONS

B. Maruyama and D. B. Gundel, Spatially Varied Interfaces, Scripta Materialia, vol. 35, No. 3, pp. 391–395, Jun. 1996.

*Primary Examiner*—Janet C. Baxter
*Assistant Examiner*—John Vanderwilt
*Attorney, Agent, or Firm*—Charles E. Bricker; Thomas L. Kundert

[57] ABSTRACT

A method for controlling the interface in a composite between the matrix material and reinforcing filaments or fibers in a composite structure which comprises the application of a patterned coating or combination of coatings on the reinforcing filaments or fibers to vary the bond between the reinforcement and the matrix. Proportioning of weak- and strong-bonded areas, their respective strengths, and design of bonding patterns can be tailored to the materials requirements of the composite.

This method can be employed to prepare metal, ceramic and polymer matrix composites.

10 Claims, 4 Drawing Sheets

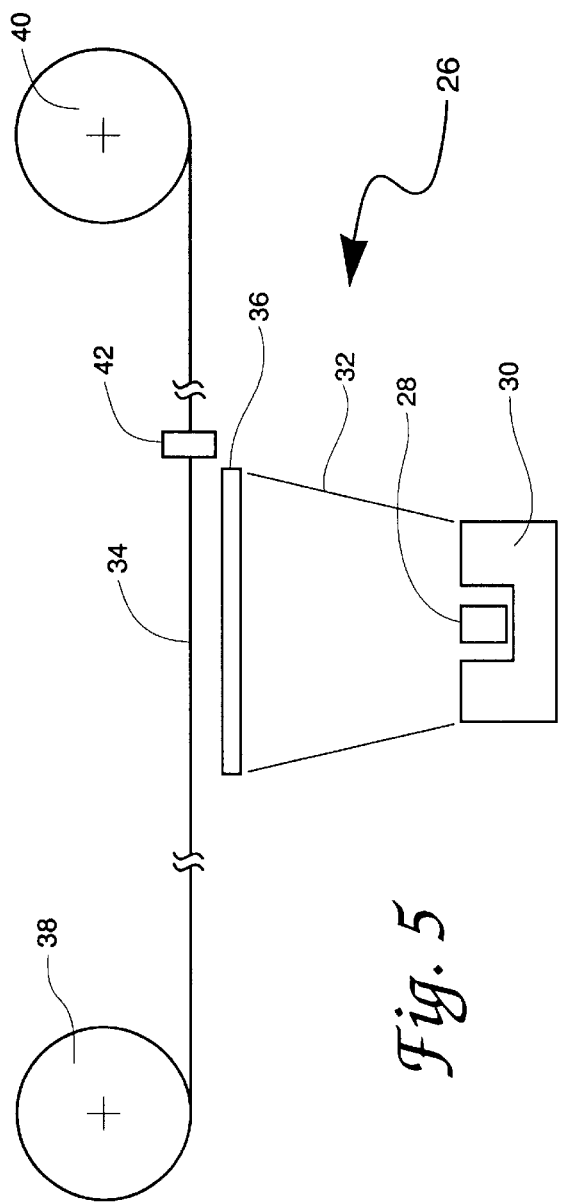
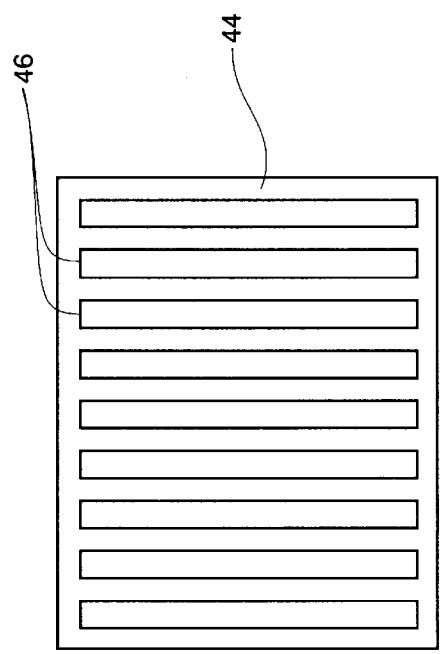

SPATIALLY VARIED INTERFACES FOR COMPOSITE MATERIALS

RIGHTS OF THE GOVERNMENT

The invention described herein may be manufactured and used by or for the Government of the United States for all governmental purposes without the payment of any royalty.

BACKGROUND OF THE INVENTION

This invention relates to a method for producing composite materials. In particular, this invention relates to a method for systematically varying the mechanical properties of a composite, particularly the bond strength between the matrix and the reinforcement.

In recent years, material requirements for advanced aerospace applications have increased dramatically as performance demands have escalated. As a result, mechanical properties of monolithic metallic materials, such as titanium alloys, often have been insufficient to meet these demands. Attempts have been made to enhance the performance of titanium and its alloys by reinforcement with high strength/high stiffness filaments or fibers.

Titanium matrix composites have for quite some time exhibited enhanced stiffness properties which closely approach rule-of-mixtures (ROM) values. However, with few exceptions, tensile and fatigue strengths are well below ROM levels and are generally very inconsistent. Attempts to increase transverse strength have failed because of a concurrent reduction in fatigue life.

Titanium matrix composites are typically fabricated by diffusion bonding of a sandwich consisting of alternating layers of metal and fibers. Several high strength/high stiffness filaments or fibers for reinforcing titanium and other metal alloys are commercially available: silicon carbide, silicon carbide-coated boron, boron carbide-coated boron, titanium boride-coated silicon carbide, silicon-coated silicon carbide (SCS) and tungsten carbide-coated silicon carbide. Under bonding conditions, which involve the simultaneous application of pressure and elevated temperature for a period of time, the titanium matrix material can be made to flow without fracture occurring, thus providing intimate contact between layers of the matrix material and the fiber. The thus-contacting layers of matrix material bond together and to the fibers by a phenomenon known as diffusion bonding (DB).

A variety of choices is available to metal matrix composite fabricators, including, inter alia, the matrix metal alloy, the fiber, the fiber coating, consolidation temperature, pressure and time, and the like. These choices allow fabrication of metal matrix composites having a variety of physical properties. However, the methods, materials of fabrication, etc., presently known, collectively have the drawback of limited control over the interface, and, therefore, composite mechanical properties. Modification of the interface by uniform coatings is expensive and lacks versatility.

Similarly, ceramic and polymeric composites exhibit enhanced strength properties as compared to unreinforced structures. As with metal matrix composites, the resulting composite structures generally have uniform physical properties over the entire composite structure.

Accordingly, what is desired is a method for controlling the mechanical response interface between the matrix and the reinforcing filament or fiber in a composite material.

It is an object of the present invention to provide a method for controlling the interface in a composite material between the matrix and the reinforcing filament or fiber.

Other objects and advantages of the present invention will be apparent to those skilled in the art.

SUMMARY OF THE INVENTION

In accordance with the present invention there is provided a method for controlling the interface in a composite between the matrix material and the reinforcing filament or fiber. The method of the present invention comprises the application of a patterned coating or combination of coatings on the reinforcement filament or fiber to vary the bond between the reinforcement and the matrix. Proportioning of weak- and strong-bonded areas, their respective strengths, and design of bonding patterns can be tailored to the materials requirements of the composite.

The method of this invention can be employed to prepare ceramic and polymer matrix composites as well as metal matrix composites.

BRIEF DESCRIPTION OF THE DRAWINGS

In the drawings,

FIG. 5 illustrates an apparatus for preparation of a patterned fiber by evaporating a material thereon;

FIG. 6 illustrates a pattern mask used in the apparatus of FIG. 5;

DETAILED DESCRIPTION OF THE INVENTION

Figure 1:
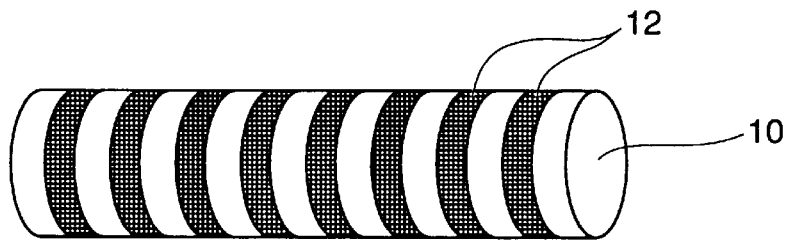
FIGS. 1–4 illustrate reinforcing fibers having a variety of patterns thereon.
Figure 2:
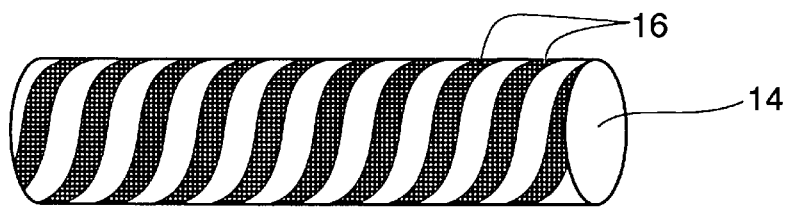
Figure 3:
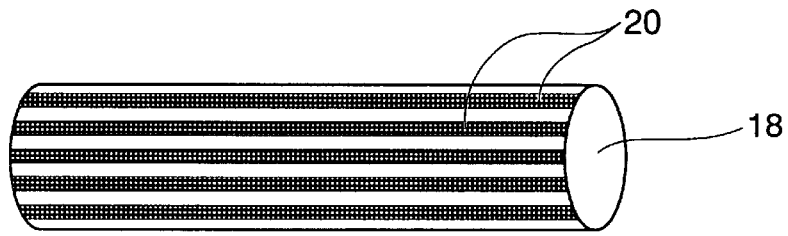

The method of the present invention comprises the steps of (a) partially coating a reinforcing fiber or filament with a material which either promotes or deters bonding between the reinforcement and the matrix material, (b) combining the coated fiber or filament with a matrix material, and (c) densifying the composite. This partial coating may in the form of bands, as shown in FIG. 1, which illustrates a fiber 10 having a plurality of bands or zones 12 of the above-referenced material. Another form of partial coating is shown in FIG. 2, which illustrates a fiber 14 having a plurality of helical zones 16 of such material. Yet another form of partial coating is shown in FIG. 3 which illustrates a fiber 18 having a plurality of longitudinally striped zones 20 of such material. A further form of partial coating is shown in FIG. 4 which illustrates a fiber 22 having a plurality of randomly distributed zones 24 of such material.

The above-referenced material which promotes or deters bonding between the reinforcement and the matrix material depends upon the application. For metal matrix composites, the preferred material is one that has little or no reactivity with or diffusivity into the matrix metal. Examples of suitable materials include carbon, yttrium, gadolinium, germanium and the like; yttrium is presently preferred because of ease of handling. Alternatively, and equally applicable to polymer and ceramic composites, a patterned photopolymerizable polymer may be employed.

For metal matrix composites, the above-referenced material can be coated onto a reinforcing fiber, such as SCS-6, Textron®, using a metal evaporation apparatus such as shown in FIG. 5. Referring to FIG. 5, a material evaporation apparatus, indicated generally by the number 26, comprises a material source 28, heating means 30 for heating the source 28 to evaporation temperature, a focusing cone 32 for directing the evaporated metal onto the fiber 34, a pattern mask 36 and transport means for transporting fiber 32. The transport means includes supply reel 38, take-up reel 40, means, not shown, for rotating reel 40, and, optionally, means 42 for rotating the fiber 34 as it is transported past the evaporated metal. Referring to FIG. 6, pattern mask 36 can be as simple as a metal sheet 44 having a plurality of rectangular cut-outs 46. Cut-outs 46 are illustrated as being of even width, however varied widths can be used. The banded pattern shown in FIG. 1 and the helical pattern shown in FIG. 2 are produced with pattern mask 36 placed with cut-outs 46 perpendicular to the target fiber, the latter being produced with rotation of the fiber. The longitudinal pattern shown in FIG. 3 is produced with pattern mask 36 placed with cut-outs 46 parallel to the target fiber. Referring again to FIG. 5, fiber 34 can be rotated by means 42 which clamps and rotates the fiber and travels with the fiber as it is transported through the apparatus. Such clamping and rotating means must be periodically reset; therefore the pattern produced will be discontinuous, but repetitive, i.e., the helical pattern will be finite, limited by the length of travel of the clamping/rotating means, rather than continuous from one end of the fiber to the other. Alternatively, the supply reel 38 or the take-up reel can be rotated to produce a continuous helical pattern.

Figure 4:

The random pattern shown in FIG. 4 can be produced by sputtering, a known process.

The alloys suitable for use in the present invention are the alpha+beta titanium alloys, the alpha-2 titanium alloys, the "orthorhombic" titanium alloys and the intermetallic alloys TiAl and Ti$_3$Al. The term "alpha+beta" means an alloy of titanium which is characterized by the presence of significant amounts of alpha phase and some beta phase. Thus, the use of the so-called "alpha-beta" alloys, such as Ti-6Al-4V, as well as the so-called "beta" alloys, such as Ti-15V-3Cr-3Al-3Sn or Ti-10V-2Fe-3Al, constitute part of the invention. Other suitable alpha+beta alloys include, for example, Ti-6Al-6V-2Sn, Ti-8Mn, Ti-7Al-4Mo, Ti-4.5Al-5Mo-1.5Cr, Ti-6Al-2Sn-4Zr-6Mo, Ti-5Al-2Sn-2Zr-4Mo-4Cr, Ti-6Al-2Sn-2Zr-2Mo-2Cr, Ti-5.5Al-3.5Sn-3Zr-0.3Mo-1Nb-0.3Si, Ti-5.5Al-4Sn-4Zr-0.3Mo-1Nb-0.5Si-0.06C, Ti-30Mo, Ti-13V-11 Cr-3Al, Ti-3Al-3V-6Cr-4Mo4Zr, Ti-15V, Ti-11.5Mo-6Zr-4.5Sn, Ti-10Mo and Ti-6.3Cr. Suitable alpha-2 titanium alloys include Ti-14Al-2 Nb and Ti-14Al-20Nb-3V-2Mo. Orthorhombic alloys contain a higher quantity of the orthorhombic phase, preferably Nb. Suitable orthorhombic titanium alloys include Ti-13Al-31Nb and Ti-13Al-40Nb. Suitable aluminides include Ti-24A-11Nb, Ti-48Al-1Nb, Ti-25Al-10Nb-3V-1Mo, Ti-48Al-1Nb-1Cr-1Mn, Ti-48-1Cr-1Mo, and Ti-48Al, as well as substantially pure Ti$_3$Al and TiAl.

The titanium composites are fabricated by diffusion bonding of a sandwich consisting of alternating layers of metal and fibers. At least four high strength/high stiffness filaments or fibers for reinforcing titanium alloys are commercially available: silicon carbide, silicon carbide-coated boron, boron carbide-coated boron and silicon-coated silicon carbide. The titanium matrix material can be made to flow without fracture occurring, thus providing intimate contact between layers of the matrix material and the fiber. The thus-contacting layers of matrix material bond together by a phenomenon known as diffusion bonding.

The metal layers for fabricating the above-described sandwich are preferably rolled foil having a thickness of 3 to 10 mils, or more preferably, rapidly solidified foil having a thickness of about 10 to 100 microns. The layers may also be produced by powder techniques, such as plasma spray, tape casting or powder cloth. The instant invention is also suited to metal matrix composite fabrication by the matrix-coated fiber technique.

Densification or consolidation of the filament/metal layer preform sandwich is accomplished by application of heat and pressure over a period of time during which the matrix material is formed around the filaments to completely embed the filaments. Consolidation is carried out at a temperature in the approximate range of 50° to 300° C. (90° to 540° F.) below the beta-transus temperature of the titanium alloy. For example, the consolidation of a composite comprising Ti-6Al-4V alloy, which has a beta transus of about 995° C. (1825° F.) is preferably carried out at about 900° C. to 925° C. (1650° to 1700° F.). The pressure required for consolidation of the composite ranges from about 66 to about 200 MPa (about 10 to 30 Ksi) and the time for consolidation can range from about 15 minutes to 24 hours or more, depending upon the thickness of the composite. Generally, consolidation time is about 2 to 4 hours.

The term "beta-transus" is well known in the art. For example, in the case of the alpha+beta and beta alloys, the term "beta-transus" refers to the temperature at the line on the phase diagram for the alloy separating the beta-phase field from the alpha-beta region where the alpha and beta phases coexist. In the case of alpha-2 alloys, the term "beta-transus" refers to the temperature at the line on the phase diagram for the alloy separating the beta-phase field from the alpha 2-beta region where the alpha 2 and beta phases coexist. In the case of the orthorhombic alloys, the term "beta-transus" refers to the temperature at the line on the phase diagram for the alloy separating the beta-phase field from the beta2+O (+alpha 2) region where the beta 2 and O, and possibly the alpha 2, phases coexist.

Figure 7:
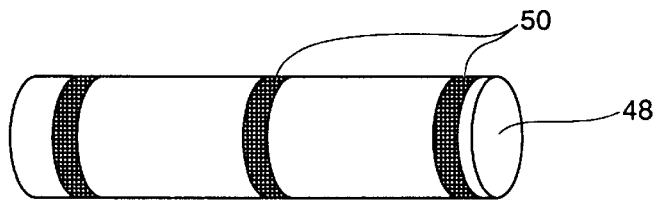
FIG. 7 illustrates a reinforcing fiber having a variant of the pattern shown in FIG. 1.

Referring again to FIG. 1, wherein the bands 12 and the regions there between are of approximately equal width, the fiber 10, when incorporated into a metal matrix composite, will provide a metal matrix composite having a set of physical properties. FIG. 7, illustrates a fiber 48 having a plurality of bands 50, but with wider regions between bands, as compared to fiber 10 of FIG. 1. Fiber 48, when incorporated into a metal matrix composite using the same fiber density, metal, consolidating conditions, etc., will provide a metal matrix composite having a different set of physical properties. Those skilled in the art will appreciate that the present invention allows control of physical properties in a metal matrix composite to a degree never before achieved merely be altering the pattern of bonding between the reinforcement and the matrix.

Figure 8:
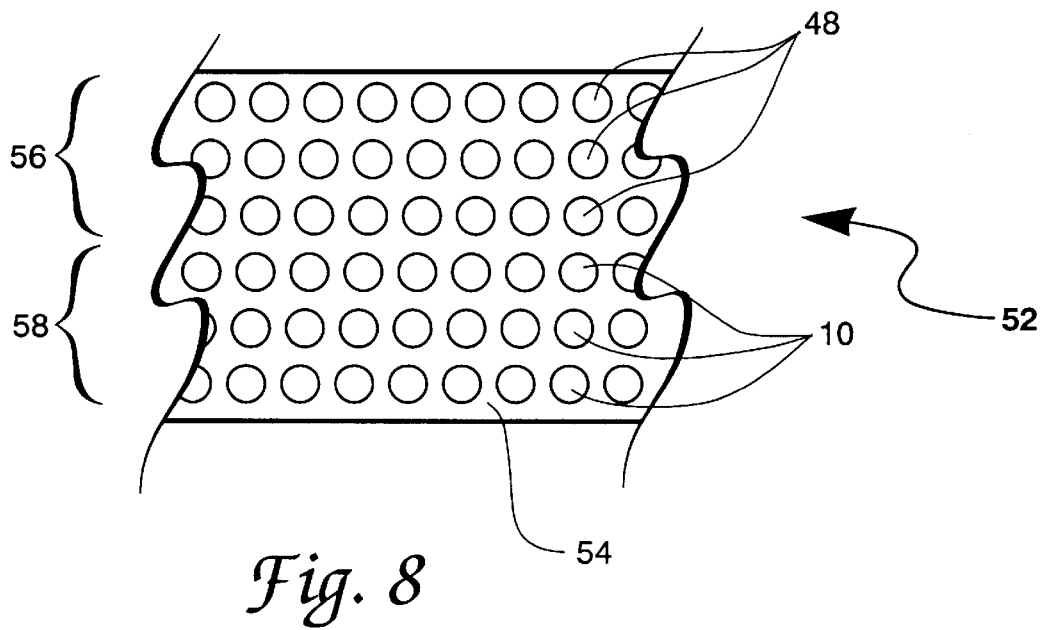
FIG. 8 is a cross-section of a composite structure having differently bonded areas.
Figure 9:
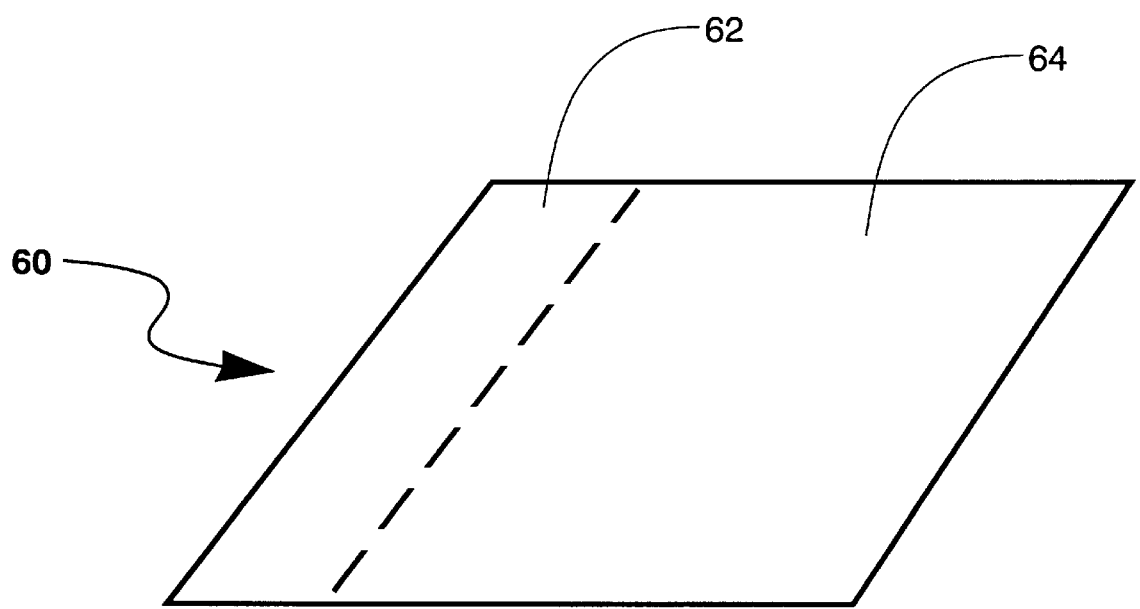
FIG. 9 illustrates a flat composite having a plurality of differently bonded areas.

The present invention further provides for different regions or zones of physical properties within a single composite structure. Referring to FIG. 8, there is illustrated a metal matrix composite 52 which consists of three layers of fiber 10 and three layers of fiber 48 in a matrix 54 of titanium alloy. Following consolidation, the structure 52 has zones 56 and 58, each having distinct physical properties. Alternatively, with reference to FIG. 9, fibers 10 and 48 may be consolidated into regions 62 and 64 of a panel 60. In this case, region 62 will have different physical properties from region 64.

Ceramic composites can be fabricated in similar fashion. Ceramic composites comprise a reinforcing fiber in a ceramic matrix. Reinforcing fibers for ceramic composites include single crystal alumina fiber (sapphire), polycrystalline alumina fiber, yttrium-aluminum garnet (YAG), polycrystalline YAG, directionally solidified YAG/alumina eutectic, silicon carbide, and the like. Ceramic matrix materials include alumina, beta-alumina, magnetoplumbites, yttrium-aluminum garnet, $MgAl_2O_4$, $Ca/ZrO_2$, $GdAlO_3$, $Gd_3Al_5O_{12}$, and the like.

Ceramic composites are fabricated using techniques known in the art. For example, a composite preform can be prepared by alternately layering a plurality of layers of fiber and matrix powder. The preform can then be pressureless-sintered at about 1700° C., then hot-isostatically pressed at about 1700° C. with about 200 Mpa applied pressure.

The pattern on ceramic fibers can be produced by a photolithographic process. Such processes are well known in the art for forming a pattern, such as metallic circuitry on a substrate in the manufacture of printed circuit boards. Briefly, the photolithographic process comprises the areas of the f a photoresist material over those areas of the substrate to be shielded from metal deposition or metal removal. A pattern is formed by imagewise exposing the photoresist material to actinic light through a photographic image.

A number of photoresist materials are well-known and are capable of forming a desired pattern. Following exposure, any unexposed material is generally removed using a solvent for the unexposed material.

For use in the present invention a photoresist material can be applied to a ceramic continuous filament or tow by passing the reinforcement through a coating bath, aerosol application or the like. The coated filament or tow is then exposed to actinic radiation to provide a desired pattern thereon. Such exposure can be made using a masking pattern or by using a directionally controlled laser. After exposure, unexposed material is removed using a solvent for the unexposed material. The patterned material which remains can be converted to a carbon pattern by passing the filament or tow through an oven or other heating means. Carbon is known to reduce or prevent bonding between a ceramic fiber and a ceramic matrix.

The photoresist technique can also be used to fabricate metal matrix composites.

Alternatively, the ceramic filament or tow can be coated with a material such as $LaPO_4$ which, functions as a weak bond interphase material between the reinforcement and the matrix. The $LaPO_4$ can be applied to the reinforcement as a slurry, e.g., $LaPO_4$ powder in iso-butanol. Excess $LaPO_4$ can then be removed using a low power laser source to provide one of the above-described patterns. Some experimentation may be required to determine the proper beam power and duration to pyrolyze the undesired $LaPO_4$.

Various modifications may be made in the instant invention without departing from the spirit and scope of the appended claims.

I claim:

1. A method for fabricating a fiber- or filament-reinforced matrix composite structure comprising the steps of (a) partially coating a reinforcing fiber or filament with a material which either promotes or deters bonding between the reinforcing fiber or filament and the matrix material to provide a patterned coating, (b) combining the coated fiber or filament with a matrix material to provide a preform, and (c) densifying the preform to provide said composite.

2. The method of claim 1 wherein said matrix material is a titanium alloy.

3. The method of claim 2 wherein said reinforcing fiber is selected from the group consisting of silicon carbide, silicon carbide-coated boron, boron carbide-coated boron, titanium boride-coated silicon carbide, silicon-coated silicon carbide and tungsten carbide-coated silicon carbide.

4. The method of claim 2 wherein said patterned coating is applied by evaporating a pattern material through a pattern mask onto said fiber or filament.

5. The method of claim 4 wherein said pattern material is selected from the group consisting of carbon, yttrium, gadolinium and germanium.

6. The method of claim 2 wherein said patterned coating is applied by applying a photoresist material to said reinforcing fiber or filament, imagewise exposing said photoresist to actinic light through a photographic mask, removing unexposed material and converting the remaining photoresist material to carbon.

7. The method of claim 1 wherein said matrix material is a ceramic material.

8. The method of claim 7 wherein said reinforcing fiber is selected from the group consisting of single crystal alumina fiber, polycrystalline alumina fiber, yttrium-aluminum garnet, polycrystalline yttrium-aluminum garnet, silicon carbide and directionally solidified yttrium-aluminum garnet/alumina eutectic.

9. The method of claim 7 wherein said patterned coating is applied by applying a photoresist material to said reinforcing fiber or filament, imagewise exposing said photoresist to actinic light through a photographic mask, removing unexposed material and converting the remaining photoresist material to carbon.

10. The method of claim 7 wherein said patterned coating is provided by applying a material which deters bonding between the reinforcing fiber or filament and the matrix material and removing a portion of said material using a laser source to provide a pattern on said fiber or filament.

* * * * *